US006847817B2

(12) United States Patent
Hadinger et al.

(10) Patent No.: US 6,847,817 B2
(45) Date of Patent: Jan. 25, 2005

(54) SATELLITE COMMUNICATION APPARATUS WITH MULTIPLE HUB STATIONS PROVIDING INCREASED BANDWIDTH TO MEET SERVICE REQUIREMENTS

(75) Inventors: Peter J. Hadinger, Oakton, VA (US); Eric R. Wiswell, Torrance, CA (US); Hau H. Ho, Huntington Beach, CA (US); Michael S. Munoz, Redondo Beach, CA (US); Terrence R. Smigla, Pacific Palisades, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 426 days.

(21) Appl. No.: 10/022,017

(22) Filed: Dec. 12, 2001

(65) Prior Publication Data

US 2003/0109220 A1 Jun. 12, 2003

(51) Int. Cl.[7] .................................................. H04Q 7/20
(52) U.S. Cl. ....................... 455/430; 455/12.1; 455/13.1
(58) Field of Search .............................. 455/12.1, 13.1, 455/427, 428, 429, 430, 431, 67.1; 370/316, 317, 318; 375/268; 342/359, 352, 356, 353

(56) References Cited

U.S. PATENT DOCUMENTS

| | | | | |
|---|---|---|---|---|
| 4,731,866 A | * | 3/1988 | Muratani et al. ............... 455/9 |
| 5,161,194 A | * | 11/1992 | Ujiie ........................... 713/160 |
| 5,450,395 A | * | 9/1995 | Hostetter et al. ........... 370/320 |
| 5,511,079 A | * | 4/1996 | Dillon .......................... 714/774 |
| 5,625,624 A | * | 4/1997 | Rosen et al. ................ 370/307 |
| 5,995,832 A | * | 11/1999 | Mallinckrodt ............... 455/427 |
| 6,041,233 A | * | 3/2000 | Rosati ......................... 455/427 |
| 6,070,073 A | | 5/2000 | Maveddat |
| 6,151,308 A | * | 11/2000 | Ibanez-Meier et al. ..... 370/316 |
| 6,160,993 A | * | 12/2000 | Wilson ...................... 455/12.1 |
| 6,233,429 B1 | * | 5/2001 | Soffer et al. ............... 455/12.1 |
| 6,256,496 B1 | * | 7/2001 | Dintelmann et al. ........ 455/427 |
| 6,295,283 B1 | * | 9/2001 | Falk ............................ 370/325 |
| 6,574,794 B1 | * | 6/2003 | Sarraf .......................... 725/63 |
| 2001/0031620 A1 | | 10/2001 | Ichiyoshi | |

FOREIGN PATENT DOCUMENTS

EP 1158701 11/2001

* cited by examiner

Primary Examiner—Tilahun Gesesse

(57) ABSTRACT

A satellite communication system (10) includes apparatus for exchanging communication data between ground-based user sites (21–24, 41–44 and 51–54) and a ground-based wideband network (60). A communication satellite (30) exchanges user communication data with the user sites. Ground-based hub terminals (27, 35, 47 and 57) exchange the user communication data with the satellite (30) and also exchange the data with the network (60). A communication manager (70) determines the communication requirements between the satellite and the network and identifies more than one hub terminal to exchange user communication data with the satellite in the event that one hub terminal is insufficient to meet the communication requirements.

17 Claims, 4 Drawing Sheets

SATELLITE COMMUNICATION APPARATUS WITH MULTIPLE HUB STATIONS PROVIDING INCREASED BANDWIDTH TO MEET SERVICE REQUIREMENTS

BACKGROUND OF THE INVENTION

This invention relates communication satellites, and more particularly relates to adaptable links between such a satellite and a ground-based wideband network.

Providing reliable high bandwidth links between spacecraft (or other vehicles) and fixed ground-based sites has been a goal for many years. High frequency bands which have greater usable bandwidth generally suffer from greater sensitivity to propagation conditions and typically have worse availability for power limited links. Systems with large numbers of links also suffer from lower reliability due to the increased likelihood of hardware failure. This invention addresses these problems and provides a solution.

BRIEF SUMMARY OF THE INVENTION

The preferred embodiment is useful in a satellite communication system. In such an environment, communication data may be sent between a plurality of ground-based user sites and a ground-based wide band network by providing a communication satellite arranged to receive user communication data from the user sites on user uplinks and to transmit user communication data to the user sites on user downlinks. A plurality of ground-based hub terminals are arranged to receive the user communication data on hub downlinks from the satellite and to transmit the user communication data to the satellite from the network on hub uplinks. A communication manager determines the communication requirements between the satellite and the network and identifies more than one hub terminal to exchange user communication data with the satellite in the event that one hub terminal is insufficient and/or unavailable to meet the communication requirements.

By using the foregoing techniques, communications between ground-based user terminals and a wideband network can be achieved with a degree of speed and reliability previously unattainable.

DETAILED DESCRIPTION OF THE INVENTION

The preferred embodiment divides the user communication data across N links or access groups, allowing N times the bandwidth to be transmitted. An additional M links or hubs are available in standby mode to be used when one or more of the N links or access groups are impaired by propagation attenuation or hardware failure. In the embodiment shown in FIG. 1, N=3 links or 3 access groups and M=1 link or 1 hub. Data is routed among fixed ground-based hub terminals by wideband links and recombined to form the original signal before being routed to the final destination. In this specification, N will be used to refer to a link associated with a specific access group (such as link 28 or link 29 shown in FIG. 1) or to an access group (such as access group 20 shown in FIG. 1) and M will be used to refer to an additional link or hub (such as hub 35 and its associated link shown in FIG. 1).

The preferred embodiment uses signaling information between a satellite, hub terminals and a network communication manager center to monitor the status of the links and re-route the user communication data through a standby path in the event of impairment. When the impairment is gradual, as in the event of propagation changes, the standby link can be established in a "make-before-break" configuration, allowing continuous data without interruption. The preferred embodiment includes the use of buffers and timing information, either in the form of packet headers or delay calibration to allow the user communication data from hub terminals to be recombined as if from a single path. The recombining is aided by using packets of data and Internet protocol.

Figure 1:
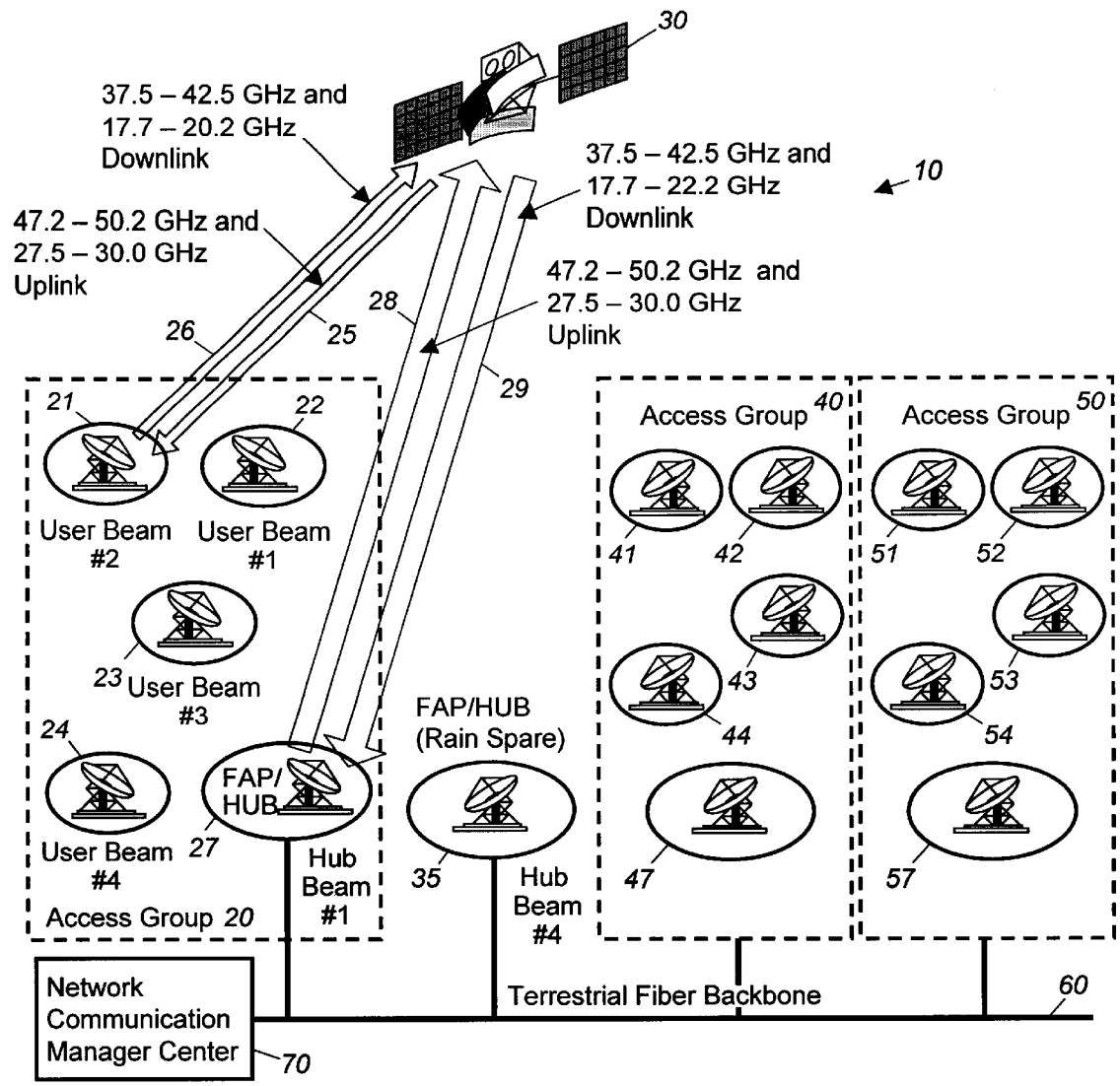
FIG. 1 is a schematic block diagram of a preferred form of the invention, including user sites, a communication satellite, hub terminals and a wideband network.

Referring to FIG. 1, a preferred embodiment of a satellite communication system 10 made in accordance with the invention includes an access group 20 comprising ground-based user sites 21–24. User site 21 exchanges user communication data with a communication satellite 30 over a user uplink 25 and a user downlink 26, and user sites 22–24 exchange user communication data with satellite 30 over similar user uplinks and user downlinks. A ground-based hub terminal 27 exchanges user communication data with satellite 30 over a hub uplink 28 and a hub downlink 29.

Regarding access group 20, satellite 30 transmits signals from user sites 21–24 to hub terminal 27, and satellite 30 transmits signals from hub terminal 27 to user sites 21–24. User terminals 21–24 can only communicate with hub terminal 27 through satellite 30, and hub terminal 27 can only communicate with user sites 21–24 through satellite 30.

A spare hub terminal 35 exchanges user communication data with satellite 30 over a hub uplink and a hub downlink similar to hub uplink 28 and hub downlink 29 when propagation conditions, such as inclement weather, between hub terminal 27 and satellite 30 preclude normal communications. Center 70 monitors the status of the hub terminal links and re-routes the user communication data through hub terminal 35 in the event of impairment. When the impairment is gradual, as in the event of propagation changes, the standby link can be established in a "make-before-break" configuration, allowing continuous data without interruption.

An access group 40 identical to access group 20 includes user sites 41–44 and a hub terminal 47. An access group 50 identical to access group 20 includes user sites 51–54 and a hub terminal 57. The user sites and hub terminals in access groups 40 and 50 exchange user communication data with satellite 30 over uplinks and downlinks in the same manner as access group 20. Additional access groups may be supplied if needed.

A wideband ground-based network 60, such as optic fiber, interconnects hub terminals 27, 35, 47 and 57 as shown. Network 60 is connected to a network communication manager center 70 that determines the communication requirements between satellite 30 and network 60 and identifies more than one of hub terminals 27, 47 and 57 for the exchange of user communication data with satellite 30 in the event that one hub terminal is insufficient to meet the communication requirements. Alternatively, manager center 70 could be located on satellite 30, or the center could be split between a ground-based location and satellite 30.

Figure 2:
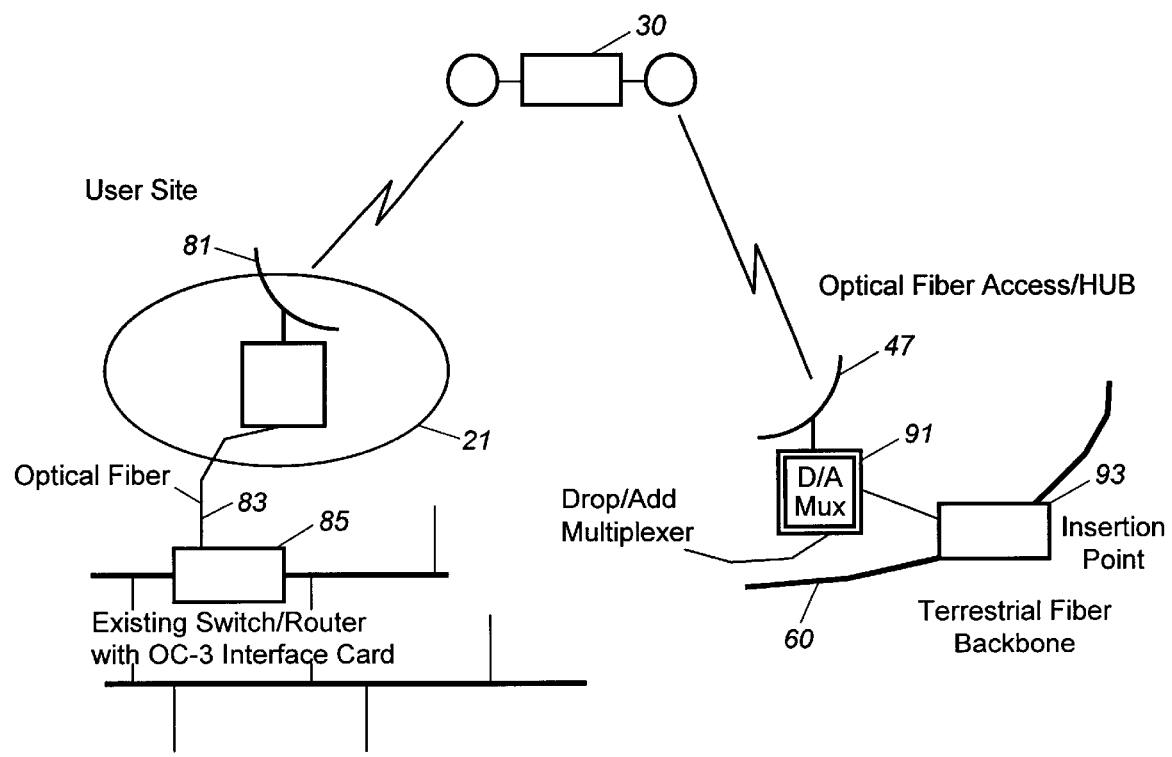
FIG. 2 is a fragmentary schematic block diagram of a portion of FIG. 1 showing additional apparatus for connecting a user site to communication fiber and connecting a hub terminal to a wideband network.

Referring to FIG. 2, user site 21 includes an antenna 81. Site 21 is connected to a switch/router interface card 85 through an OC-3 fiber 83. The other user sites are connected in a similar manner. Hub terminal 47 is connected to network 60 through a drop/add multiplexer 91 and an insertion point 93. The other hub terminals are connected to network 60 in a similar manner.

Figure 3:
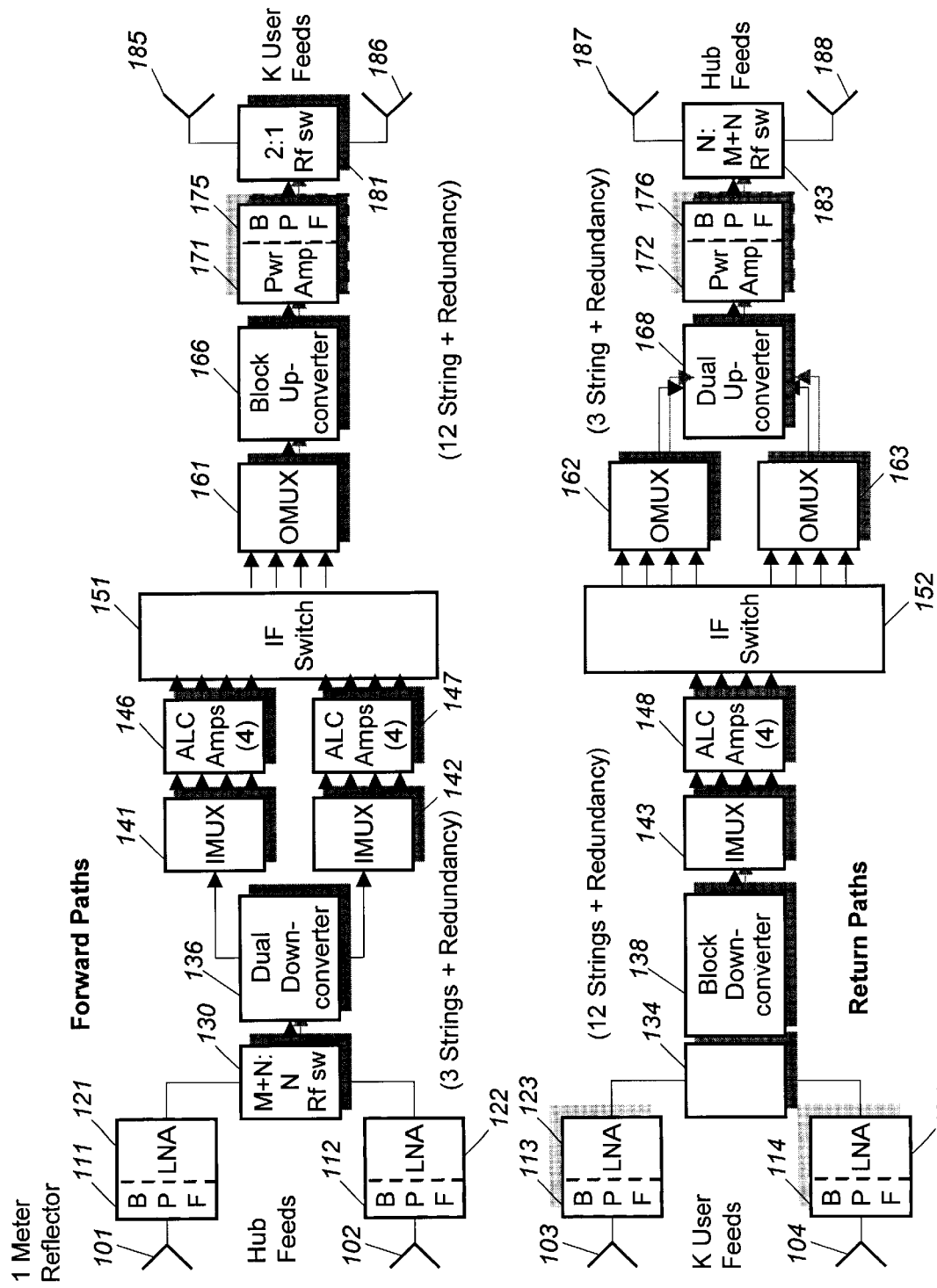
FIG. 3 is a schematic block diagram of a portion of the communication satellite shown in FIG. 1.

Referring to FIG. 3, satellite 30 includes receive antennas 101–104 arranged as shown. Antennas 101 and 102 receive user communication data over uplinks from hub terminals 27, 35, 47 and 57 and send the data through a forward path shown in FIG. 3. Antennas 103 and 104 receive user communication data from the user site uplinks and send the data through a return path as shown in FIG. 3.

Each of the antennas 101–104 is connected to one of band pass filters 111–114 as shown. The band pass filtered signals are processed by low noise amplifiers 121–124 connected as shown.

In the forward path, a radio frequency (M+N):N switch 130 passes the processed signals from the hub terminals to a dual down converter 136. In the embodiment shown in FIG. 1, (M+N):N=4:3.

In the return path, a radio frequency 2:1 switch 134 passes the processed signals to a block down converter 138.

The forward and return paths also include input multiplexers 141–143 and ALC amplifiers 146–148 connected as shown. The amplifiers supply signals to intermediate frequency signal switches 151–152.

The outputs of switches 151–152 supply signals to output multiplexers 161–163 connected as shown. In the forward path, the multiplexers feed a block up converter 166 and in the return path they feed a dual up converter 168.

The outputs of converters 166 and 168 supply power amplifiers 171–172 and band pass filters 175–176 connected as shown.

In the forward path, a radio frequency redundant switch 181 supplies signals to transmit antennas 185–186, and in the return path, a radio frequency N:(M+N) switch 183 supplies signals to transmit antennas 187–188. In the embodiment shown in FIG. 1, N:(M+N)=3:4. Antennas 185–186 transmit user communication data to user site downlinks, and antennas 187–188 transmit user communication data to downlinks of hub terminals 27, 35, 47 and 57.

Manager center 70 determines which hub terminal uplink or downlink, if any, is impaired due to propagation conditions, such as weather. In the event that the link is impaired, center 70 causes hub terminal 35 to be activated to exchange user communication data between satellite 30 and terminal 35.

Manager center 70 also monitors the amount of data required to be exchanged between various hub terminals and satellite 30. If the communication requirements within one of the access groups cannot be met by the hub terminal associated with that access group, then center 70 causes the user communication data to be exchanged with two or more of the hub terminals.

For example, if user site 21 requires that a large amount of data be sent to network 60, and hub terminal 27 cannot provide sufficient bandwidth, center 70 causes hub terminal 47 and/or hub terminal 57 to transmit a portion of the user communication data from user site 21 to network 60, in addition to hub terminal 27. Thus, parallel paths of communication are provided by hub terminals 27, 47 and 57 so that the user communication data from user site 21 can be transmitted to network 60 with improved speed and accuracy. Conversely parallel paths also can be provided, if necessary, to transmit user communication data between network 60 and user site 27. By transmitting the user communication data in the form of packets, such as internet packets or ATM cells, the data may be automatically delivered to the correct address after the parallel communication paths have provided improved speed and accuracy. Preferably, the packet of data are transmitted with Internet protocol. In other words, assuming that each of hub terminals 27, 47 and 57 comprises one link, center 70 can spread the user communication data across 3 links, allowing 3 times the bandwidth to be transmitted. Hub terminal 35 represents an additional link that is available in standby mode to be used when one or more of the 3 links is impaired by propagation or hardware failure.

The user sites include buffers and timing information, either in the form of packet headers or delay calibration, to allow the user communication data from different hub terminals to be recombined as if from a single path. The recombining is aided by using packets of data and Internet protocol.

Referring to FIG. 3, each payload has four hub antennas. However, only three hub antennas will be used at any instant. The satellite has the capability of selecting three out-of-four best links in the following manner:

a) In the forward link, from hub terminals to satellite: Satellite payload receives a command from control center 70 requesting to change switches 130 and 151 to select the three best links.

b) In the return link, from satellite to hub terminals: Satellite payload also receives a command from control center 70 requesting to change switches 152 and 183 to select the three best links.

The control center 70 measures the link quality, either from hub-to-satellite or from satellite-to-hub and determines where the links meet the desired link availability. If the existing link, from hub-to-satellite or satellite-to-hub does not meet the required link availability due to the rain fade or due to the hardware failure, the control center 70 will send a command to the satellite requesting to switch to other hub beams.

Still referring to FIG. 3, switches 134 and 181 are used to provide redundancy protection. For example, switch 181 provides 24 user feeds, only 12 of which are needed for the 12 user sites of access groups 20, 40 and 50.

Figure 4:
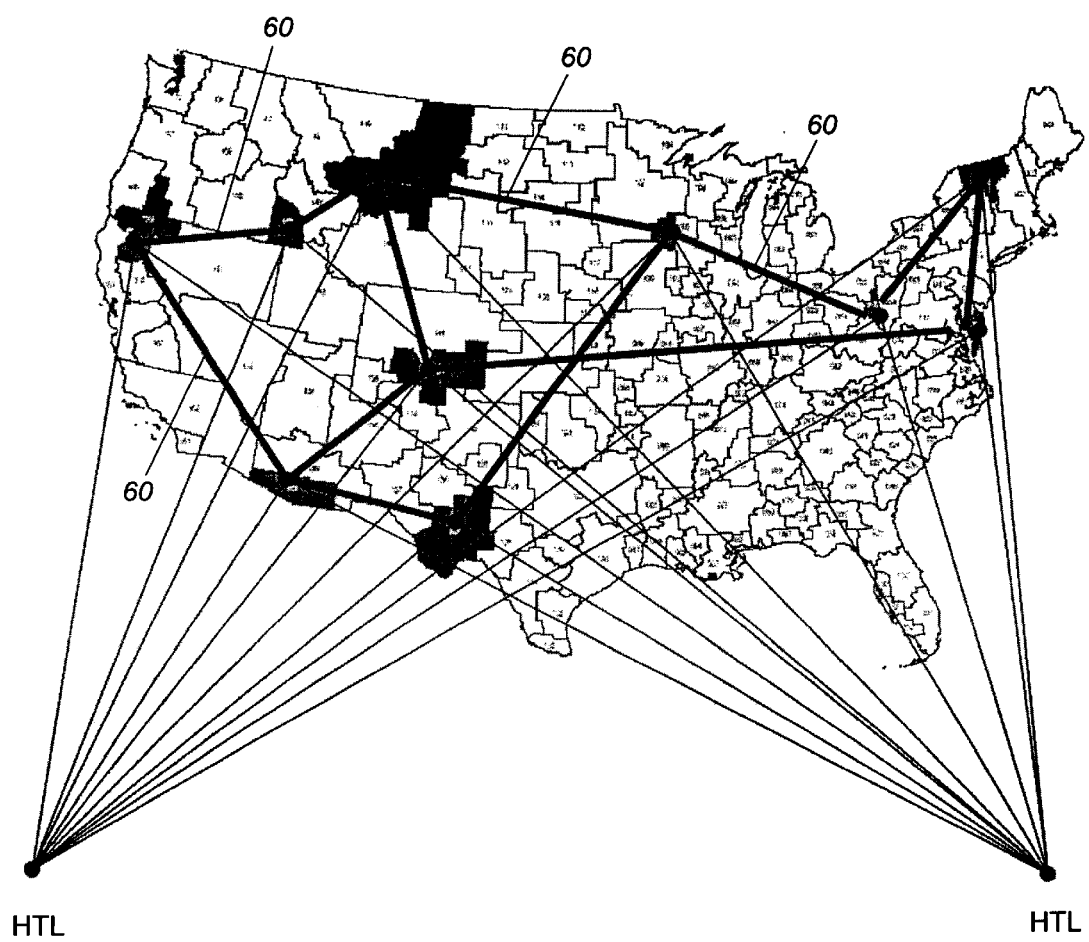
FIG. 4 is a diagram showing exemplary locations for the hub terminals shown in FIG. 1.

Referring to FIG. 4, the hub terminals may be located in areas with wideband access to network 60, such as the areas HTL. HTL means hub terminal location. As shown in FIG. 4, as an example, the hub terminals are located in areas sufficiently separated in distance to allow frequency reuse by satellite 30.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. In a satellite communication system, apparatus for transmitting communication data across a plurality of ground-based user sites of a ground-based wide band network where, on the onset of data transmission impairments a protocol is sent to additional ground-based links or hub terminals to maximize satellite system power flux density, and to re-route and to hand over communication data from ground-based user sites to ensure communication data continuity, the apparatus comprising:

one or more communication satellites arranged to receive user communication data from the user sites on user uplinks and to transmit user communication data to user sites on user downlinks;

a plurality of ground-based hub terminals arranged to receive the user communication data on hub downlinks from the one or more satellites and to transmit the user communication data to the one or more satellites, from the network on hub uplinks;

a communication manager configured to determine communication requirements between the satellite and the network and to identify a plurality of hub terminals to exchange user communication data with the satellite in the event that one hub terminal is insufficient to meet the communication requirements;

wherein user communication data is transmitted over parallel paths through the plurality of hub terminals in the event that one hub terminal is insufficient to meet the communication requirements.

2. Apparatus, as claimed in claim 1, wherein the communication manager comprises a ground-based network manager.

3. Apparatus, as claimed in claim 1, wherein the communication manager resides at least in part in the satellite.

4. Apparatus, as claimed in claim 1, wherein the user communication data comprises a data stream of information.

5. Apparatus, as claimed in claim 4, wherein the data stream of information is continuous.

6. Apparatus, as claimed in claim 4, wherein the data stream of information comprises discrete data packets, which are routed along the parallel paths provided by the plurality of hub terminals in the event that one hub terminal is insufficient to meet the communication requirements, thereby utilizing increased bandwidth provided by the parallel paths.

7. Apparatus, as claimed in 6, wherein the packets are transmitted with Internet protocol, to facilitate transmission over the parallel paths.

8. Apparatus, as claimed in claim 7, wherein the packets comprise ATM cells, to facilitate transmission over the parallel paths.

9. Apparatus, as claimed in claim 4, wherein the data stream of information is encrypted.

10. Apparatus, as claimed in claim 1, wherein the hub terminals are sufficiently separated in distance to receive multi-beam satellite signals from the one or more communication satellites, without using different frequencies.

11. Apparatus, as claimed in claim 10, wherein the hub terminals are located in areas with wide-band access to the network.

12. Apparatus, as claimed in claim 1, wherein the hub terminals comprise one or more spare terminals for use when propagation impairment degrade communication between satellite and another of the hub terminals.

13. Apparatus, as claimed in claim 12, wherein the communication manager is configured to determine whether propagation impairments between satellite and one of the hub terminals requires use of the spare hub terminal.

14. Apparatus, as claimed in claim 13, wherein the spare hub terminal increases satellite system power flux density upon signal propagation impairment.

15. Apparatus, as claimed in claim 13, wherein the spare hub terminal is redeployed as a spare when the hub terminal experiencing degraded communication has service restored.

16. Apparatus, as claimed in claim 12, wherein the propagation impairments comprise weather.

17. Apparatus, as claimed in claim 12, wherein the propagation impairments comprise equipment outages.

* * * * *